Patented Jan. 26, 1943

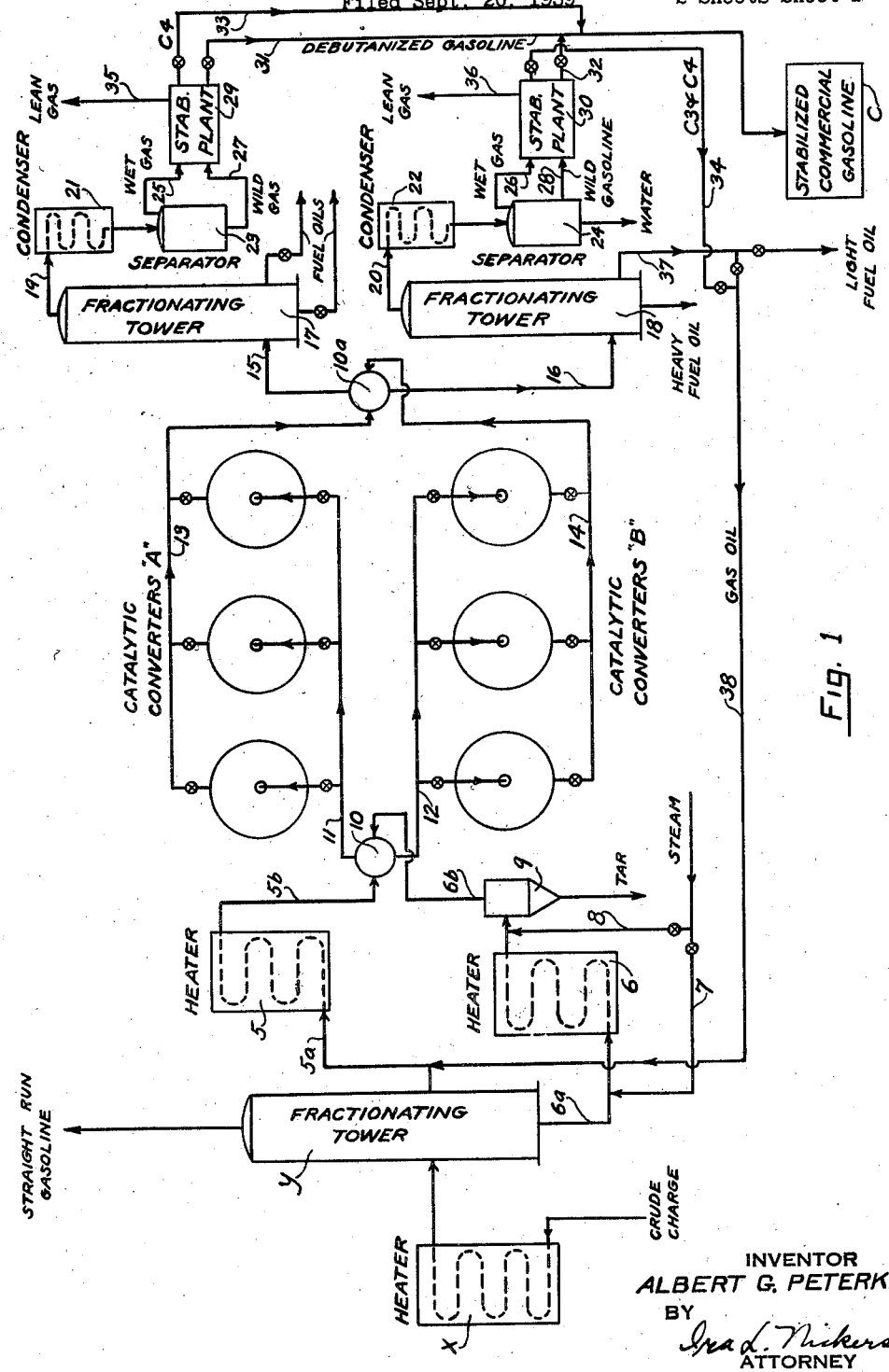

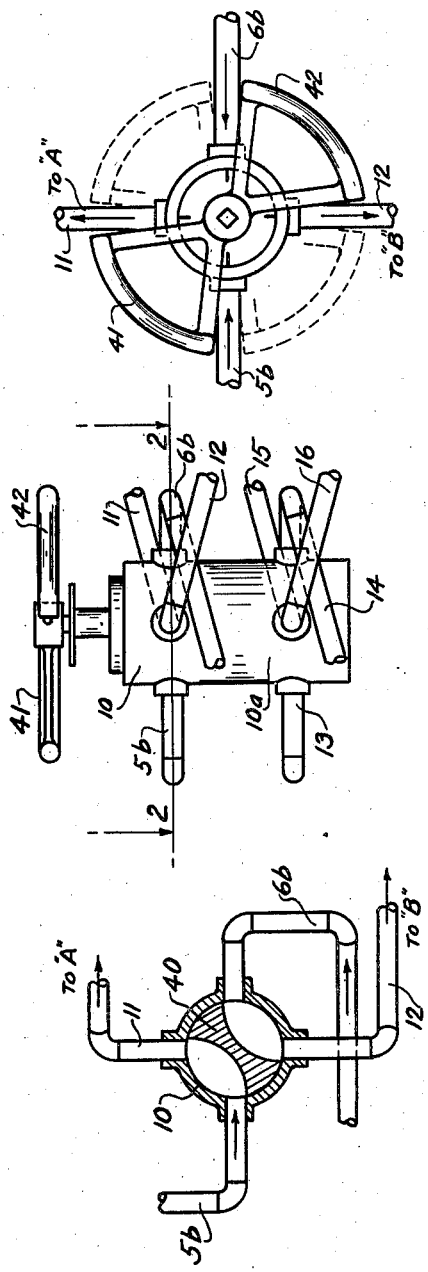

2,309,137

UNITED STATES PATENT OFFICE 2,309,137

CATALYTIC CONVERSION OF HYDROCARBONS

Albert G. Peterkin, Bryn Mawr, Pa., assignor to Houdry Process Corporation, Wilmington, Del., a corporation of Delaware Application September 20, 1939, Serial No. 295,709

17 Claims. (Cl. 196—9)

This invention relates to catalytic operations. More particularly, it concerns the conversion of hydrocarbons from any source in the production of valuable liquid fuels including gasoline.

One object of the invention is to produce a high yield of motor or other fuel oils. Another object is to utilize catalysts to the best advantage and for long periods with renewals kept to a minimum. Another object is to devise methods of operation and forms and combinations of apparatus for accomplishing the above purposes. Other objects will be apparent from the detailed description which follows.

The invention involves the utilization of catalysts of high activity for the conversion of relatively light charging stocks, as in the gas oil boiling range, to produce a high yield of motor fuel and the utilization of catalysts of lower or moderate activity for the conversion of heavy charging stocks, as those higher boiling than gas oil, into motor fuel and other material suitable for further conversion, such as products in the gas oil boiling range capable of being cracked by highly active catalysts to give high yields of motor fuel and unsaturated or olefinic gases capable of being polymerized by highly active catalysts to form liquids in the gasoline boiling range. After the highly active catalysts have depreciated in activity so that desired yield or quality of products is not obtained, they are then used for the conversion of the heavy charging stocks. By preference, this change is effected without removing the catalyst and by a mere switching of the charge from one converter or battery of converters to another. Thus when two batteries of converters are in use, it is only necessary to replace the catalyst in one battery. Normally, the less active catalyst will be discarded and replaced by very active catalyst for the relatively low boiling charge, while the catalyst previously used for this charge then has the heavy charging stock sent thereto. To prolong the life and activity of the highly active catalyst, vaporizing media, such as steam, which tend to accelerate the deterioration of the catalyst, are avoided entirely or used only to a very restricted extent with the relatively low boiling charge, but such media are freely used with heavy charge since they are needed to facilitate the reaction. In fact, the use of a different or lower activity catalyst for the heavy charge not only insures a high yield of gasoline therefrom but also furnishes products suitable for addition to the charge to the high activity catalyst for conversion into hydrocarbons in the gasoline boiling range. The products from the high activity catalyst are highly saturated and stable; hence the fixed gases therefrom are low in unsaturates or olefins and may be used to best advantage to bring the debutanized gasoline from both catalytic zones to the proper vapor pressure for commercial gasoline. On the other hand the products from the zone of lower catalytic activity are relatively more unstable and contain more unsaturates so that the fixed gases therefrom provide a desirable polymerization charge to the high activity catalyst.

In order to illustrate the nature of the invention and how it can be applied, one concrete embodiment thereof is indicated in the accompanying drawings, in which:

Fig. 1 is a diagrammatic lay-out of a plant having two batteries of converters;

Fig. 2 is a plan and partly sectional view of a valve for switching charge to either battery of converters, the section being substantially on the line 2—2 of Fig. 3;

Fig. 3 is a side elevational view of a double valve for simultaneously controlling the charge to and the products from both batteries of converters; and Fig. 4 is a top plan view of the control valves shown in Figs. 1, 2 and 3.

Fig. 1 shows two batteries of catalytic converters, A and B, respectively, each battery made up of three converters. Two separate heaters are provided for supplying charge to the batteries, as well as separate means for handling the products from the batteries. Heater 5 is adapted and intended to handle the charge in the naphtha and gas oil boiling range, as with an initial boiling point at or somewhat above the end boiling point of gasoline (as about 440° F.) and with a final boiling point of approximately 750° F., such selected charge to be sent to the converters with little, if any, diluent or vaporizing medium. Heater 6, on the contrary, is adapted to handle heavy charging stocks boiling to substantial extent above approximately 750° F., such as crude oil bottoms, which may contain a considerable quantity of tarry or asphaltic material, vaporizing of such material being facilitated by adding to the charge, before or after the heater or at both places as by lines 7 and 8, vaporizing media such as steam, nitrogen, hydrogen, methane, or other gaseous materials. Following heater 6, a tar separator 9 (or a coker) of any suitable or desired type is provided to separate from the charge all unvaporized components.

When an entire crude is to be transformed, there may be preliminary vaporizing and fractionating equipment in advance of heaters 5 and 6, to prepare the charge therefor, which preliminary equipment may comprise a vaporizing heater or still X, which discharges into suitable fractionating equipment such as tower Y, from which one or more side stream outlets such as 5a provide charge for heater 5, while a lower or bottom outlet 6a furnishes the charge to heater 6. Alternatively the crude charge may be passed through heat exchangers (not shown) in the outlet lines from the converter batteries and through coils (not indicated) in either or both of heaters 5 and 6 with one or more flash towers (also not shown) to effect a rough but adequate segregation and preparation of the charging stocks.

Discharge lines 5b and 6b from heaters 5 and 6, respectively, serve as inlet lines to a single control valve 10, shown in greater detail in Figs. 2, 3 and 4, from which valve an outlet line 11 connects by suitably valved branches to the converters in battery A, while a similar outlet line 12 connects by valved branches with the converters in battery B. The products from the converters of battery A leave by valved connections to a manifolding line 13, while the products of the converters of battery B leave by valved connections to a similar manifolding line 14, these two lines 13 and 14 being connected as inlets to valve 10a, similar in all respects to valve 10. Valve 10a has outlet connections 15 and 16, respectively, leading to the previously mentioned separate equipment for products resulting from the different types of charge. Line 16 is intended to carry the conversion products originating from the charge sent to heater 5, and the equipment therefor comprises fractionating tower 17, which may have side stream and bottom outlets, as indicated, for the withdrawal of fuel oils of different boiling ranges, and an overhead outlet line for lower boiling products which are conducted through condenser 21 and thence into a separator 23 which has an upper outlet line 25 for wet gas and a lower outlet line 27 for wild gasoline, both of which lines lead to a stabilizing plant 29 of any known or suitable type, from which stabilized debutanized gasoline is withdrawn by line 31, C4 hydrocarbons by line 33, and lean gas by line 35.

Corresponding equipment is provided for the products originating from the charge sent to heater 6 which are conducted by line 16 to fractionating tower 18, from which an overhead line 20 conducts the lower boiling products through condenser 22 into a separator 24 having an outlet at the bottom for water and other outlets for wet gas by line 26 and for wild gasoline by line 28, which lines lead to stabilizing plant 30, from which stabilized, debutanized gasoline is conducted by line 32, while C3 and C4 hydrocarbons are withdrawn by line 34, and lean gas by line 36.

The stabilized, debutanized gasoline leaving stabilizing plants 29 and 30, by lines 31 and 32, are combined and then brought to desired vapor pressure by adding some or all of the butanes which leave stabilizing plant 29 by line 33, the commercial gasoline thus formed being immediately withdrawn for sale or sent to storage as in tank C.

Since the very active catalyst used to crack the gas oil charged to heater 5 tends to produce saturated rather than unsaturated products, the gases of the four carbon atom group will be, for the most part, saturated and hence can be used to best advantage in bringing the combined debutanized gasoline to desired vapor pressure. The heavy or higher boiling charge to heater 6, on the other hand, cracks easily and also tends to lay down more coke on the catalyst, both of which considerations make the use of a catalyst of relatively lower activity highly important in obtaining a high yield of gasoline, but the products in general are less stable than those from the highly active catalyst. This tendency toward unsaturation or instability makes the products higher boiling than gasoline and lower boiling than gasoline suitable for further conversion. The higher boiling products conforming substantially to the boiling range of the charge to heater 5 are withdrawn from fractionating tower 18 in one or more side streams, as by line 37, and some or all of such products may be sent through line 38 to join line 5a and thus be added to the charge to heater 5. Gases high in unsaturates and olefins which are readily polymerized to liquids in the gasoline boiling range leave stabilizing plant 30 by line 34 and are, by preference, added to the charge to heater 5 to be polymerized in the high activity catalytic zone. Line 34 may lead directly to line 5a or may joint line 38 as indicated. With most charging stocks, the gas produced in the high activity cracking operation provides sufficient hydrocarbons of the four carbon atom group to raise the debutanized gasoline from both cracking operations to the vapor pressure of commercial gasoline, so that all of the $C_3$ and $C_4$ hydrocarbons from the cracking operation on heavy charges can be recycled with the charge to the high activity catalytic zone.

The converters making up batteries A and B may be of any suitable or known type, and may be charged with any known or suitable types of catalyst which will produce the intended cracking reactions. By preference, the converters are arranged for accurate temperature control of the reactions and for regeneration of the catalytic mass in place. At least two converters will be provided in each battery, so that at least one converter may be on stream for the cracking operation while one or more converters in the same battery are in regeneration, thus permitting continuous operation. The connections and equipment for effecting regeneration in place have been omitted from the present drawings in the interests of clarity and simplicity and because they form no part of the present invention. Exemplary converters adapted for use in batteries A and B are illustrated in many issued patents, as, for example, in U. S. Patent No. 2,042,469, issued June 2, 1936, to Alfred Joseph; No. 2,042,468 issued on the same date to Eugene J. Houdry; and Nos. 2,078,947, 2,078,948, and 2,078,949, all issued on May 4, 1937, to Eugene J. Houdry.

A type of catalyst which is suitable for the cracking operations is silicious in nature and preferably comprises blends or compounds of silica and alumina with or without the addition of other active ingredients including metals and metallic compounds. These blends or compounds may be of natural or artificial origin. Suitable catalysts are disclosed in U. S. Patents Nos. 2,078,945 and 2,078,951, which issued May 4, 1937, to Eugene J. Houdry. Catalysts of very high activity can be produced synthetically by formation of base exchange bodies from reactant solutions under controlled pH conditions followed by treatment with a solution containing an exchangeable volatile or decomposable cation to reduce the alkali metal content to 1% or less, as disclosed, for example in the copending application of John R. Bates, Serial No. 170,648, filed October 23, 1937. Stabilization of activity may be effected before the catalyst is used by high temperature treatment by a suitable gaseous agent as disclosed in the copending application of John R. Bates, Serial No. 289,915, filed August 12, 1939.

In beginning operations, one battery of converters, such as A, will be filled with new or very highly active catalytic material, and provision will be made to protect the catalyst against loss of activity in known ways, such as by keeping steam or other materials which impair the activity of the catalyst out of contact with the catalyst as much as possible during both the on-stream and regenerating periods. Hence the use of steam as the vaporizing medium or diluent is avoided entirely or kept to a minimum. On the contrary, the charge to converters B, which will be filled with more inert catalyst and where loss of activity is not so important, may contain diluents such as steam in large quantities, as up to 50% by weight, such diluent being of value in securing a maximum amount of hydrocarbons in vapor phase from heavy tarry or asphaltic charging stocks. Thus loss of catalyst activity is concentrated in the low activity zone both by selection of charge and by the manner of operation. However, under the most careful operating conditions, there is a gradual loss of activity of most known catalysts, and, when the very highly active catalyst has been impaired to a point where the desired yields are not being secured, the low activity catalyst in the other battery of converters, B in the present instance, is removed and discarded, and new, highly active catalyst is charged thereto, whereupon valves 10 and 10a are manipulated to switch the lower boiling charge from heater 5 to catalytic battery B, and the heavy charge in heater 6 to battery A. If the activity of the catalyst in battery A is still too high for the conversion of the heavy charge, the catalyst may be given a preliminary treatment with steam or other poisoning medium to reduce its activity to that desired for maximum gasoline yield or production of suitable charging material to be sent to the high activity zone. It should be noted that, when the charge is switched, the products from the converter batteries are also switched, so that, except for the catalytic zones, the charge sent to heater 5 always goes through the same equipment after the cracking operation, and the same is true of the charge from heater 6.

The switching of charge and products is effected quickly and easily by utilizing valves such as 10 and 10a, preferred forms of which are illustrated in detail in Figs. 2, 3 and 4. As illustrated in Fig. 2, control of the entering and exit streams is effected by a single central member 40, which has oppositely cut away sides. In the position shown in Fig. 2, line 5b is connected to outlet line 11, so that the gas oil charge is passing to catalytic zone A, while line 6b is connected to outlet line 12, with the heavy charge from heater 6 passing to catalytic zone B. Arcuate handles 41 and 42 on the top of the valve (Fig. 4) may be provided to actuate the valve and to indicate the manner of flow of the charging streams. By turning control member 40 so that the arcuate ends thereof cover the diametrically opposed inlet lines 5b and 6b or the diametrically opposed outlet lines 11 and 12, all the lines may be blocked off. Fig. 3 illustrates a single casing in which valves 10 and 10a are mounted together in superposition but without fluid communication therebetween, so that the turning of the valve through handles 41 and 42 to switch the charge from one catalytic zone to another will, at the same time, switch the products issuing from such zones and eliminate any possibility of products going to the wrong treating equipment. The arcuate handles are arranged to give a visual indication of the inlet and outlet lines of the valve which are connected; for example, handles 41 and 42 in Fig. 4 show the position of control member 40 in Fig. 2.

It will be clear from the above that the present invention takes advantage of characteristics of hydrocarbon fractions, adjusts catalytic activity thereto, and provides an operation of extreme flexibility. By suitable adjustment of operating conditions, catalyst activity, feed rate, reaction temperature, duration of on-stream reaction, etc., the yield of hydrocarbons in the gasoline boiling range in the high catalytic activity zone may be anywhere from 40 to 60% and in the low catalytic activity zone from 35 to 50%. Thus if the same quantity of charge is initially sent to both zones, the operation may be set to produce from 37 to 55% of gasoline from a single pass, which percentage will be still further increased by the extent of recycling from the low activity zone to the high activity zone. The source or composition of the starting material is also a factor in the quantity and character of products. By utilizing silica-alumina catalysts, high yields of clean, high quality products are readily attainable with low or moderate pressures in the temperature range of approximately 750° to 950° F., and the reactions in the catalytic zones may be so directed as to emphasize or to favor the production of aviation gasoline, or of normal motor gasoline, or of power kerosene, or of Diesel fuel, or of domestic or other commercial fuel oils. By keeping the products from the catalytic zones segregated, different qualities of similar products are available. For example, in producing aviation gasoline, that from the high activity zone will have much lower acid heat than from the lower activity zones because of the higher degree of saturation in products from the high activity zone. Thus the refiner can sell two grades of any product or blend the products for an intermediate quality.

I claim as my invention:

1. Process of converting a hydrocarbon charge which comprises the steps of utilizing two cracking zones containing, respectively, a catalyst of higher activity and a catalyst of lower activity for the production of desired liquid fuels from the charge, dividing the charge into two fractions of different boiling ranges, sending in parallel streams and under reaction conditions the lower boiling of the fractions to the catalytic zone containing catalyst of higher activity and the higher boiling of the fractions to the other catalytic zone, fractionating the products from said catalytic zone of low activity in the absence of products from said high activity zone, and adding to the lower boiling fraction supplied to said zone containing catalyst of higher activity liquid products from the other catalytic zone which are within the boiling range of said lower boiling fraction.

2. Process of converting a hydrocarbon charge which comprises the steps of utilizing two cracking zones containing, respectively, a catalyst of higher activity and a catalyst of lower activity for the production of desired liquid fuels from the charge, dividing the charge into two fractions of different boiling ranges, sending in parallel streams and under reaction conditions the lower boiling of the fractions to the catalytic zone containing catalyst of higher activity and the higher boiling of the fractions to the other catalytic zone, fractionating the products from said catalytic zone of low activity in the absence of products from said high activity zone, and adding to the lower boiling fraction supplied to said zone containing catalyst of high activity liquid products within the boiling range of said last mentioned fraction and gaseous products capable of polymerization from said lower activity catalytic zone.

3. In the production of motor fuel by the action of a regenerative catalyst of high activity which is operated alternately on-stream in the production of motor fuel and in regeneration to free the catalyst from contaminating deposits in preparation for another on-stream operation, the process steps of limiting the charge during on-stream operation to hydrocarbons in the gas oil and naphtha boiling ranges over a series of said alternating periods until the activity of the catalyst is definitely reduced, and thereafter changing the charge to hydrocarbons boiling predominately above the gas-oil range for another series of such alternating operations.

4. Process of utilizing a regenerative catalyst of high activity to a maximum extent in the production of motor fuel in cycles of alternate on-stream and regenerative reactions which comprises charging hydrocarbons selected from the class of naphthas and gas oils and boiling wholly or predominately below 750° F. under reaction conditions to said catalyst during on-stream reactions of repeated cycles until its activity is permanently impaired, and thereafter charging heavier hydrocarbons boiling predominately above 750° F. to said catalyst during on-stream reactions of another series of said cycles.

5. Process of producing a high yield of gasoline from hydrocarbons higher boiling than gasoline which comprises subjecting hydrocarbons predominately in the naphtha and gas oil boiling range under reaction conditions to a catalyst of high activity to produce gasoline, independently subjecting hydrocarbons higher boiling than gas oil under reaction conditions to a catalyst of lower activity to make gasoline and to give products suitable for charge to said catalyst of high activity, and utilizing said first named catalyst after loss of activity for said operation on hydrocarbons higher boiling than gas oil.

6. Process of utilizing catalytic material in recurring cycles of on-stream and regenerative reactions in the production of desired liquid fuels including gasoline which comprises dividing hydrocarbon starting material into two charges of different boiling ranges, subjecting the lower boiling of said charges under reaction conditions to the action of the catalytic material during on-stream periods until its activity is somewhat impaired, and then subjecting the higher boiling of said charges under reaction conditions during on-stream periods to the action of said catalytic material so as to utilize the latter to a maximum extent before replacement becomes necessary.

7. Process of effecting by catalytic action maximum production of desired liquid fuels including gasoline which comprises dividing hydrocarbon starting material into two fractions, one of which boils substantially entirely below 750° F. and the other substantially entirely above 750° F., and subjecting said fractions separately and independently under reaction conditions to the action of the same catalyst, the lower boiling fraction being charged to said catalyst so long as the latter retains a high degree of activity and the higher boiling fraction being charged thereto only after the activity of said catalyst has been permanently impaired to substantial extent.

8. Process of converting hydrocarbons catalytically which comprises sending a hydrocarbon charge predominately in the boiling range of 440° to 750° F. under reaction conditions through a zone containing a catalyst of high activity to produce gasoline, sending a hydrocarbon charge boiling predominately above 750° F. under reaction conditions through a zone containing a catalyst of different activity to produce gasoline and a substantial quantity of clean products boiling between 400° and 750° F., switching said second named charge to said first zone after the catalyst therein has deteriorated in activity, and switching said first charge to said second zone after the catalyst in said second zone has been replaced by highly active catalyst, and repeating the switching of charge from one zone to the other whenever the need for new high activity catalyst arises which need is met by discarding only the then low activity catalyst.

9. Process of producing a high yield of gasoline from hydrocarbons higher boiling than gasoline which comprises subjecting hydrocarbons predominately in the naphtha and gas oil boiling range under reaction conditions and with a small quantity of vaporizing material to a catalyst of high activity to produce gasoline, independently subjecting hydrocarbons higher boiling than gas oil with a sufficient quantity of vaporizing material to insure vapor phase conditions and under reaction conditions to a catalyst of relatively lower activity to make gasoline and to give products suitable for further conversion, and utilizing said first named catalyst after permanent loss of activity for said operation on hydrocarbons higher boiling than gas oil.

10. Process of converting hydrocarbons catalytically which comprises sending a hydrocarbon charge predominately in the boiling range of 440° to 750° F. under reaction conditions through a zone containing a catalyst of high activity to produce gasoline, sending a hydrocarbon charge boiling predominantly above 750° F. under reaction conditions through a zone containing a catalyst of relatively lower activity to produce gasoline and a substantial quantity of clean products boiling between 400° and 750° F., switching said second named charge to said first zone after the catalyst therein has deteriorated in activity, switching said first charge to said second zone after the catalyst in said second zone has been replaced by highly active catalyst, repeating the switching of charge from one zone to the other whenever the need for new high activity catalyst arises which need is met by discarding only the then low activity catalyst, and prolonging the life of the high activity catalyst by minimizing or entirely avoiding the use of vaporizing media such as steam and of the low activity catalyst by removing unvaporized or unvaporizable hydrocarbons before the charge enters the low activity catalytic zone.

11. Process of converting hydrocarbons into desired liquid fuels which comprises dividing the hydrocarbons into two charges of different boiling ranges, providing two catalytic reaction zones containing respectively catalysts of different activities, simultaneously sending under reaction conditions the lower boiling charge to the high activity catalytic zone and the higher boiling charge to the lower activity catalytic zone, and from time to time discarding the catalyst of lower activity and replacing it with high activity catalyst, and thereupon switching the charges between the zones so that the lower boiling charge goes at all times to the zone containing the catalyst of higher activity.

12. Process of converting hydrocarbons into desired liquid fuels which comprises dividing the hydrocarbons into two charges of different boiling ranges, providing two catalytic reaction zones containing respectively catalyst of high activity and catalyst of lower activity, simultaneously sending under reaction conditions the lower boiling charge to the high activity catalytic zone and the higher boiling charge to the lower activity catalytic zone, and from time to time discarding the catalyst of lower activity and replacing it with high activity catalyst, and thereupon switching the charges between the zones so that the lower boiling charge goes at all times to the zone containing the catalyst of higher activity, and adding to the charge to the zone of high catalytic activity at least a part of the products from the zone of lower catalytic activity which are not higher boiling than said charge.

13. Process of converting hydrocarbons into desired liquid fuels which comprises dividing the hydrocarbons into two charges of different boiling ranges, providing two catalytic reaction zones containing respectively catalyst of high activity and catalyst of lower activity, simultaneously sending under reaction conditions the lower boiling charge to the high activity catalytic zone and the higher boiling charge to the lower activity catalytic zone, fractionating the products from said reaction zones in separate fractionating zones to remove therefrom separate quantities of debutanized gasoline and of gaseous hydrocarbons of the $C_4$ group adding said separated $C_4$'s resulting from said high activity catalytic zone to the debutanized gasoline from both said fractionating zones to adjust the vapor pressure thereof, and adding the separated $C_4$'s resulting from said lower activity catalytic zone to said lower boiling charge to be polymerized in said high activity catalytic zone.

14. Process of converting hydrocarbons into desired liquid fuels including gasoline which comprises dividing the hydrocarbons into two charges of different boiling ranges providing two catalytic reaction zones containing catalysts of differing characteristics, simultaneously sending the charges under reaction conditions separately to said catalytic zones, fractionating the products from said reaction zones in separate fractionating zones to effect segregation of the products from said charges, after permanent change in the characteristics of at least one of said catalysts discarding the catalyst in one of said reaction zones and replacing it with fresh catalyst, and thereupon switching the charges between said catalytic reaction zones and simultaneously switching the products of said zones between said fractionating zones so that the products of each charge always go to the same fractionating zone regardless of the reaction zone to which the charge is sent.

15. Apparatus for treating hydrocarbons comprising at least two batteries of converters, separate means for sending charges of different boiling range characteristics to said batteries, separate means for receiving and segregating the products from said batteries of converters, means for selectively switching said charges between said batteries of converters, means for selectively switching the products from said batteries of converters between said products receiving means, and means for simultaneously actuating both said switching means whereby the products of each charge are always directed to the same products receiving means regardless of the battery of converters to which the charge is sent.

16. Apparatus for treating hydrocarbons comprising at least two batteries of converters, separate means for sending charges of different boiling range characteristics to said batteries, separate fractionating means for receiving and segregating the products from said batteries of converters, a valve for alternating both charges between said batteries, a valve for alternating the products of both of said batteries between said separate fractionating means, and means for simultaneously controlling the actuation of said valves so that the products of each charge always go to the same fractionating means.

17. Apparatus for treating hydrocarbons comprising separate converters with separate means for sending charge under reaction conditions to said converters and with separate means for fractionating products from said converters, and superposed valves actuated simultaneously and in unison for alternating said converters between said separate charging and fractionating means so that the same charge always reaches the same fractionating means.

ALBERT G. PETERKIN.

CERTIFICATE OF CORRECTION.

Patent No. 2,309,137.  January 26, 1943.

ALBERT G. PETERKIN.

It is hereby certified that error appears in the printed specification of the above numbered patent requiring correction as follows: Page 2, first column, line 36, for "Line 16" read --Line 15--; and second column, line 28, for "joint" read --join--; page 3, first column, line 51, for "charging" read --charging--; and that the said Letters Patent should be read with this correction therein that the same may conform to the record of the case in the Patent Office.

Signed and sealed this 6th day of April, A. D. 1943.

(Seal)

Henry Van Arsdale,
Acting Commissioner of Patents.